(12) United States Patent
Hale et al.

(10) Patent No.: US 6,564,317 B1
(45) Date of Patent: May 13, 2003

(54) METHOD AND APPARATUS FOR SECURING COMPUTER FIRMWARE WHEREIN UNLOCKING OF NONVOLATILE MEMORY IS PROHIBITED UNLESS ADDRESS LINE MASKING IS DISABLED DURING AN INITIALIZATION EVENT

(75) Inventors: Robert P. Hale, Portland, OR (US);
John V. Lovelace, Hillsboro, OR (US);
Christopher J. Spiegel, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/468,202

(22) Filed: Dec. 20, 1999

(51) Int. Cl.$^7$ ............................ G06F 15/177; G06F 9/24
(52) U.S. Cl. ............................ 713/1; 713/2; 711/113; 711/135; 710/49
(58) Field of Search .................. 713/2, 1; 711/135, 711/113; 710/49

(56) References Cited

U.S. PATENT DOCUMENTS

| | | | | |
|---|---|---|---|---|
| 5,155,833 A | * | 10/1992 | Cullison et al. ............ 711/113 |
| 5,509,139 A | * | 4/1996 | Ayash et al. ................ 710/3 |
| 5,581,727 A | * | 12/1996 | Collins et al. .............. 711/135 |
| 5,787,479 A | * | 7/1998 | Jessani et al. .............. 711/144 |
| 5,796,984 A | * | 8/1998 | Pearce et al. ............... 703/24 |
| 6,003,116 A | * | 12/1999 | Morita et al. ............... 711/118 |
| 6,243,827 B1 | * | 6/2001 | Renner, Jr. .................. 714/6 |
| 6,308,265 B1 | * | 10/2001 | Miller ........................ 713/2 |
| 6,341,143 B1 | * | 1/2002 | Nelson et al. ............... 375/222 |

* cited by examiner

Primary Examiner—Thomas Lee
Assistant Examiner—James K. Trujillo
(74) Attorney, Agent, or Firm—Mark V. Seeley (57) ABSTRACT

A method and apparatus for initializing a computer system, which includes a lockable nonvolatile memory coupled to a processor having maskable address lines and a cache, when a nonvolatile memory update is in process. When an update is in process, the nonvolatile memory is unlocked in response to the initialization event only if address line masking is disabled, and at least a portion of the processor cache is invalidated to ensure the processor will fetch the first instruction from the nonvolatile memory.

15 Claims, 7 Drawing Sheets

METHOD AND APPARATUS FOR SECURING COMPUTER FIRMWARE WHEREIN UNLOCKING OF NONVOLATILE MEMORY IS PROHIBITED UNLESS ADDRESS LINE MASKING IS DISABLED DURING AN INITIALIZATION EVENT

FIELD OF THE INVENTION

This invention relates to the field of computer systems. In particular, this invention is drawn to methods and apparatus for securing computer firmware.

BACKGROUND OF THE INVENTION

In order to ensure that a computer system can be initialized to a secure context, the boot process must be secure. A computer system typically includes a processor such as a microprocessor that is designed to respond to an initialization event by initializing or resetting itself to a predetermined state. The process of initializing the computer system is often referred to as "booting" the computer system.

During the boot process, the processor executes initialization code to perform a number of initialization and security related functions. Performance of these functions is vital to ensure the security and integrity of the computer system. The initialization code is stored in nonvolatile memory to ensure availability upon application of power to the computer system. The nonvolatile memory is often modifiable to enable updating the initialization code as the computer system configuration is changed, however, any modifications should be performed within a secure context free from the ill-intentioned effects of unauthorized code such as viruses or the unintended effects of authorized code gone awry.

Without a secure context during the boot or nonvolatile memory modification process, the integrity and security of all subsequent operations may be suspect. If the boot process is insecure or if the nonvolatile memory is capable of being modified in a manner that affects the boot process, the security of the computer system is at risk. The nonvolatile memory may be left in a vulnerable state or altered such that subsequent boot processes are no longer secure. Once the security is breached, an unauthorized program may wreak havoc by destroying or modifying information and code stored in the nonvolatile memory. Alternatively, a more benign program may expose the computer system to security risks by simply preventing the computer from performing the functions vital to security during the boot process.

SUMMARY OF THE INVENTION

In view of limitations of known systems and methods, methods and apparatus for enabling a secure boot process of a computer system are described. One method of initializing a computer system depends on whether a nonvolatile memory update is in process. The computer system includes a lockable nonvolatile memory coupled to a processor having maskable address lines and a cache. When an update is in process, the nonvolatile memory is unlocked in response to the initialization event only if processor address line masking is disabled. In addition, at least a portion of the processor cache is invalidated to ensure the processor will fetch the first instruction from the nonvolatile memory.

A computer system apparatus includes a lockable nonvolatile memory and a processor having maskable address lines and a cache. Logic circuitry coupled to the nonvolatile memory and the processor prohibits unlocking of the nonvolatile memory unless address line masking is disabled. In response to an initialization event, the logic circuitry invalidates at least a portion of the processor cache, initializes the processor and unlocks the nonvolatile memory if the address line masking is disabled.

An alternative method affirmatively disables the address line masking in response to the initialization event if a nonvolatile memory update is in process. The method includes the steps of unlocking the nonvolatile memory and invalidating at least a portion of the processor cache referencing the nonvolatile memory.

An alternative embodiment of the computer system apparatus includes a lockable nonvolatile memory and a processor having maskable address lines and a cache. Logic circuitry coupled to the nonvolatile memory and the processor prohibits unlocking of the nonvolatile memory unless address line masking is disabled. The logic circuitry disables address line masking, initializes the processor, and unlocks the nonvolatile memory in response to an initialization event if a nonvolatile memory update is in process.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
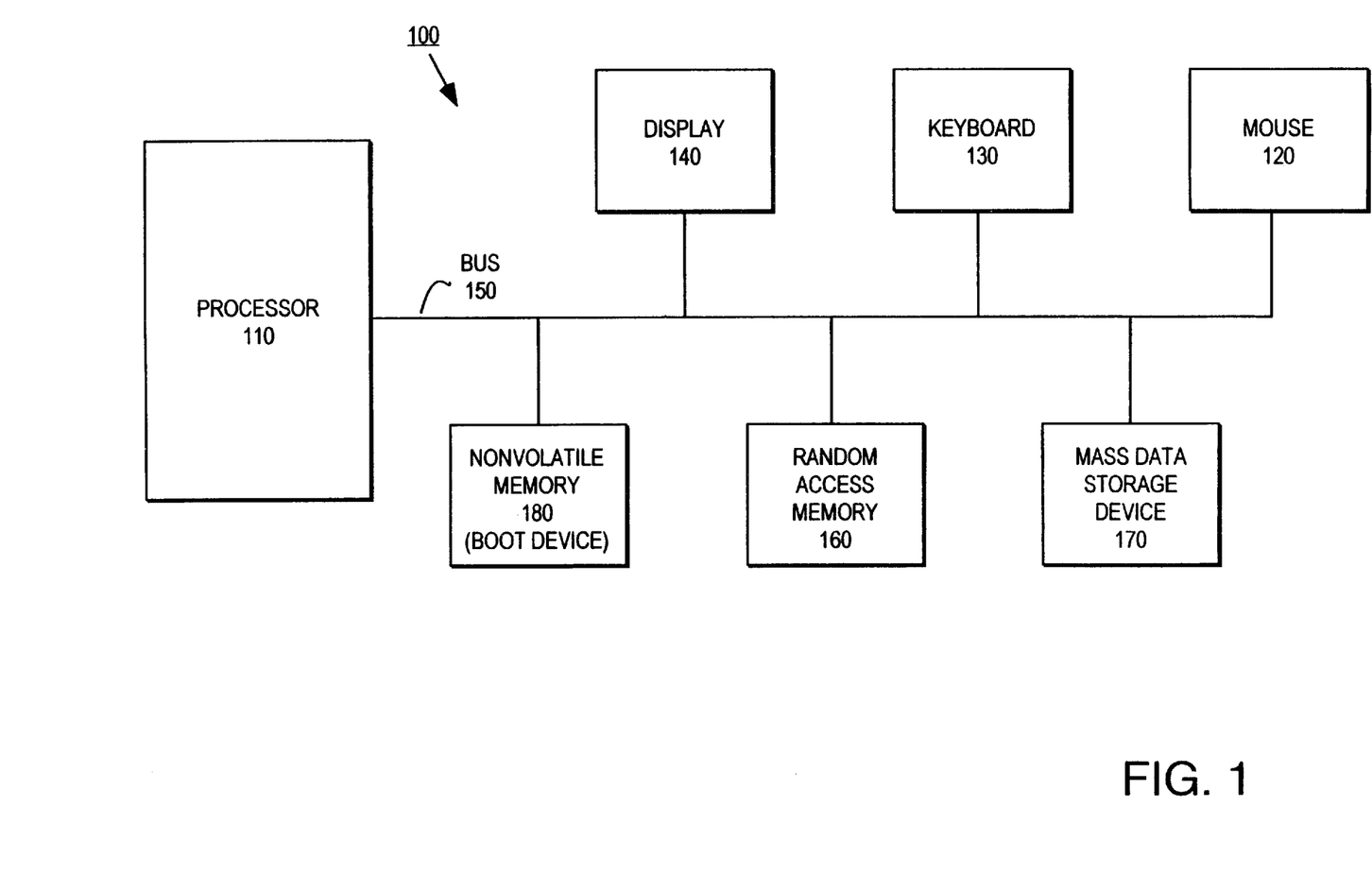
FIG. 1 illustrates a generic computer system architecture.

FIG. 1 illustrates a basic microprocessor-based computer system architecture. The computer system 100 includes processor 110. Input devices such as mouse 120 and keyboard 130 permit the user to input data to computer system 100. Information generated by the processor is provided to an output device such as display 140. Computer system 100 generally includes random access memory (RAM) 160.

Nonvolatile mass data storage device 170 is used to retain programs and data even when the computer system is powered down. In one embodiment nonvolatile mass storage device 170 is an electro-mechanical hard drive. In another embodiment nonvolatile mass storage device 170 is a semiconductor nonvolatile memory. Nonvolatile memory 180 stores initialization routines for the computer system. Mouse 120, keyboard 130, RAM 160, nonvolatile memory 180, and nonvolatile mass storage device 170 are communicatively coupled to processor 110 through one or more address and data busses such as bus 150.

Initialization of the computer system is performed upon power-up of the computer system or in response to hardware or software reset operations. Typically, the processor is designed to read a pre-determined memory location when the processor is reset or powered up. This pre-determined location is identified by a boot vector and can be referred to as the boot vector target. The boot vector and boot vector target are also referred to as the reset vector and reset vector target, respectively. The pre-determined memory location is typically an address in nonvolatile memory such as nonvolatile memory 180. The initialization routines are stored in a nonvolatile memory to ensure availability when the computer system is powered-up or reset.

The device storing the bootstrap loader and other minimal initialization procedures is referred to as the boot device. Nonvolatile memory 180 is the boot device in computer system 100. In one embodiment, nonvolatile memory 180 stores a bootstrap loader and other initialization routines such as power on self test (POST). The routines and data stored within nonvolatile memory 180 are frequently collectively referred to as "firmware."

Nonvolatile memory 180 may include routines to enable communication between the processor and input/output devices of the computer system. In some computer systems these routines are collectively referred to as the Basic Input Output System (BIOS). The BIOS identifies components of the computer system, maps resources, determines the state of the computer system upon initialization, and provides support for an operating system so that software executing on the processor can communicate with input/output devices such as the keyboard, mouse, nonvolatile mass memory storage device, and other peripheral devices. In various embodiments, nonvolatile memory 180 is a semiconductor nonvolatile memory such as flash electrically re-writable nonvolatile memory. The use of an electrically re-writable nonvolatile memory enables modifying the memory instead of replacing the memory in order to implement a new set of BIOS routines.

In one embodiment, the nonvolatile memory is referred to as a firmware hub ("FWH"). The FWH comprises a plurality of blocks. Each block comprises a plurality of memory cells. The cells are individually programmable. Once programmed the cells are erased by erasing an entire block of cells at a time. The FWH includes one or more block-lock registers configurable for controlling read and write access to individual blocks of the FWH.

When the FWH is initialized (i.e., receives an INIT signal), the block-lock registers are initialized to a state that enables read, write, and erase access to the corresponding blocks (i.e., unlocked). The block-lock registers have the capability, however, of being locked down so that no modification to the access privileges can be made until the next time the FWH is initialized.

As long as the computer system is able to execute only secure initialization code before locking down the blocks, the nonvolatile memory should be impervious to software attack during the remainder of the computer session (i.e., until the next initialization event that might leave the blocks unlocked).

Figure 2:
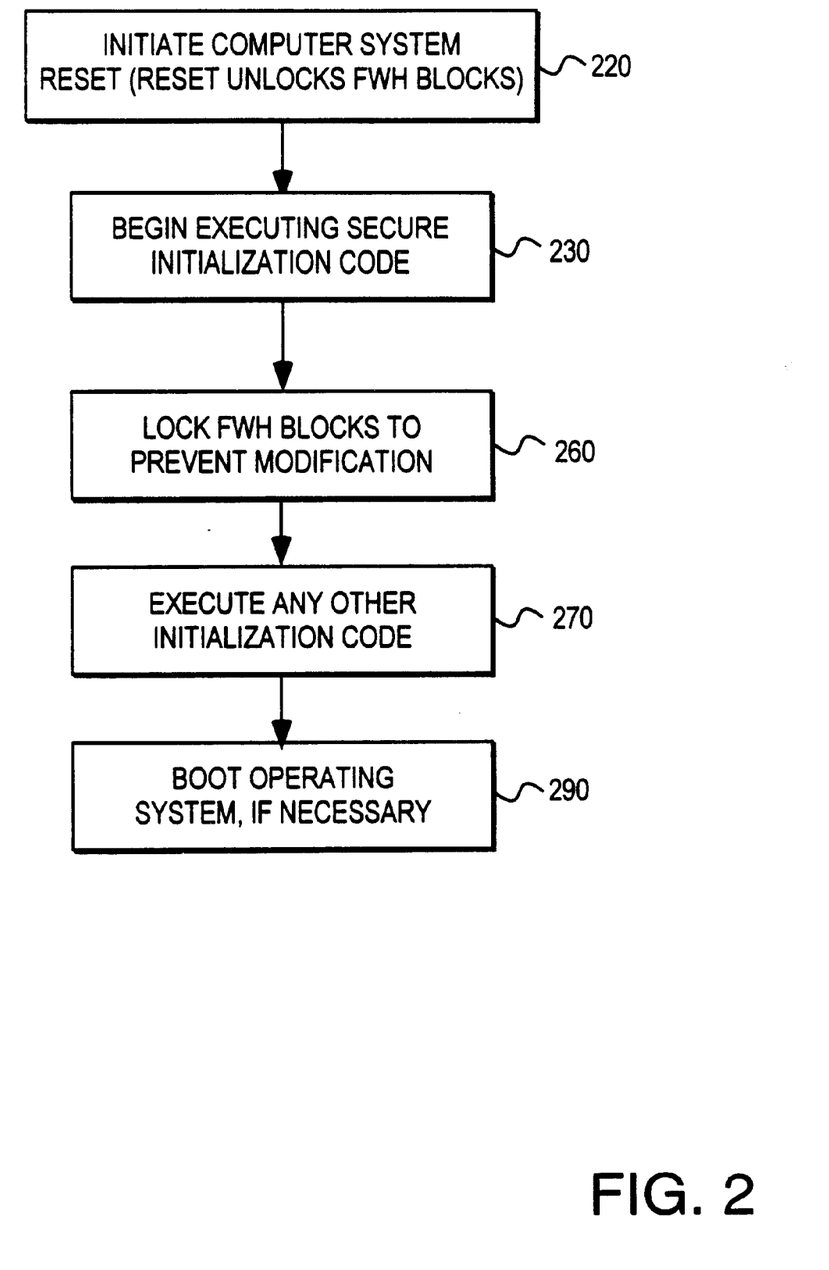
FIG. 2 illustrates one embodiment of a computer system boot sequence.

FIG. 2 illustrates a simplified embodiment of a computer system boot process when the FWH is not being updated as might be the case when power or a RESET are applied to the computer system. The initialization event is received in step 220. In step 230, the microprocessor begins fetching and executing initialization code beginning at a pre-determined address identified by a processor boot vector. This first instruction must be stored in nonvolatile memory to ensure availability upon powering up the computer system. In one embodiment, the boot vector identifies an address within a nonvolatile memory such as the FWH that is presumed to be secure.

In one computer system architecture, the boot vector points to a FWH nonvolatile memory address associated with the BIOS. The BIOS includes power on self-test code, interrupt service routines, device service routines, and configuration tables describing the computer system to the operating system.

Once the BIOS ensures that the computer system is booting in a secure context, the BIOS locks down the FWH blocks to prevent modification as indicated in step 260. The blocks must remain unlocked until a determination is made that a nonvolatile memory update is not in process, otherwise modification of the nonvolatile memory would not be possible. Once locked, the blocks cannot be unlocked during a given session (i.e., until the next initialization event). Any remaining initialization code can then be executed in step 270.

Depending upon the type of initialization event, the computer system may need to boot the operating system. Some types of initialization events can occur during a session such that the operating system is not entirely incapacitated. The operating system may not already be running, for example, if the initialization event is the application or re-application of power to the computer system. Accordingly, the operating system is booted in step 290, if necessary.

Processors such as those manufactured by Intel Corporation (Santa Clara, Calif.) often behave differently depending upon the type of initialization event. Processors belonging to the Intel Corporation "x86" family of microprocessors or to other microprocessor families designed to be code compatible with Intel x86 microprocessors are frequently used in computer system designs. Intel microprocessors such as the x86 family of microprocessors have enjoyed a long history and widespread use. Each generation of the x86 family has offered the capability of supporting software originally designed for earlier generations of the microprocessor. As the microprocessors become more sophisticated over time, so too does the complexity of ensuring program code compatibility with previous generations of the microprocessors in addition to providing new features.

One type of initialization event is a "power-up" or the application of power to the microprocessor. Another type of initialization event is the assertion of the RESET# pin of a microprocessor's integrated circuit package (i.e., performing a RESET). For Intel x86 family microprocessors, a power-up or RESET initialization event causes the microprocessor to perform a "hardware reset" of the processor and an optional built-in self-test. For these microprocessors, a hardware reset sets each of the processor's registers to a known state and places the processor in "real" address mode. A hardware reset also invalidates the internal caches, translation lookaside buffers, and branch target buffers. The microprocessor begins fetching and executing initialization code starting at a pre-determined location identified by the boot vector.

Some members of the x86 family have an INIT# pin as part of the microprocessor integrated circuit package. Assertion of the INIT# pin is another type of initialization event. Assertion of the INIT# pin (i.e., performing an INIT) invokes a response similar to that of a hardware reset, however, the internal caches and certain other elements are left unchanged. An INIT provides a method for switching from "protected" mode to real mode while maintaining the contents of the internal caches.

As long as the computer system is reset to the intended pre-determined state and then initialized using secure boot routines, the computer system is in a secure context. The FWH is presumed to be a source of secure code because the originally installed BIOS is provided by the original equipment manufacturer (OEM) of the computer system and the update procedures are secure. The processor must at least initially fetch instructions from the FWH device until the secure context has been established. The security can be circumvented if the processor can be forced to execute code other than the secure boot code.

At least two techniques could be used in an attempt to circumvent the secure boot code for computer systems based on x86 microprocessors and subsequent microprocessors designed to be code compatible (hereinafter Intel architecture microprocessors).

One technique relies on a feature provided to ensure compatible with legacy applications. In particular, the technique relies on the maskable address lines of the Intel Corporation x86 architecture to force the processor to fetch instructions from an address other than that identified by the boot vector during initialization. Another technique uses the processor instruction cache in a manner that causes the processor to retrieve insecure code from the cache instead of retrieving the secure code from the FWH upon initialization.

The namesake of the x86 architecture (i.e., the Intel 8086 processor) utilized a segmented memory architecture. Physical memory locations were identified using a 16 bit segment register and a 16 bit offset. A physical memory address was identified by shifting the contents of the segment register left four bits and adding the offset. This addressing mode is often referred to as "real mode."

The 8086 only had 20 address lines (A0–A19). As a result, the microprocessor's physical address space was limited to approximately one megabyte. Depending upon the segment and offset values chosen, however, computation of the address could result in a situation such that 21 bits would be required to express the address internally. Due to the external physical limitations of the 8086, any address bits beyond the $20^{th}$ address line would have no effect. Thus for some segment and offset values, the physical address space of the 8086 would effectively "wrap around" the bottom of memory even if the address could be uniquely expressed internally.

Some applications designed for the 8086 either deliberately used this feature or detected its occurrence and handled it in an application-specific manner. These and other applications designed for a microprocessor having the 20 bit physical address are referred to as legacy applications.

Later generation microprocessors tended to have larger physical address spaces than the 8086. As microprocessors became more sophisticated, the microprocessor's physical address bus tended to increase in size in order to support the larger address space. The Intel 80286 microprocessor, for example, includes 24 address lines. The Intel 80386DX microprocessor, for example, includes 32 address lines.

The presence of a $21^{st}$ address line could prevent legacy applications designed to take advantage of or to account for its non-existence from executing properly. Therefore, an address masking function was provided to ensure legacy applications could execute properly on computer systems designed around microprocessors having an effective address bus width of more than 20 bits. In particular, computer systems designed around these later microprocessors typically included an address line masking function to disable address line A20 (the $21^{st}$ address line).

With respect to the Intel x86 family of microprocessors, a mask control signal effectively masks the $21^{st}$ address line (A20) to force it to a pre-determined value (logical "0"). When enabled, the mask control signal ensured that a pre-determined value (i.e., "0") was always asserted for address line A20.

The address line masking function has been implemented in a number of ways. Computer systems designed around the Intel 80286 microprocessor or Intel 80386 microprocessor, for example, used masking circuitry external to the microprocessor. Logic external to the microprocessor effectively masked at least one address line used to access the memory in response to a mask control signal. The Intel 80486 microprocessor and the Intel Pentium® processor have address line masking circuitry internal to the microprocessor's integrated circuit package. The address line masking circuitry is responsive to a mask control signal applied to a pin of the microprocessor's integrated circuit package. In computer systems designed around these microprocessors, the mask control signal itself is typically provided by the keyboard controller.

Computer systems based on Intel architecture microprocessors typically have a processor boot vector that identifies a location near the top of memory, such as FFFF FFF0. When A20 is masked, however, the effective boot vector will be FFFE FFF0. Thus in order to access the top of memory where the BIOS is located, the address line masking must be disabled.

Initialization events such as the application of power or the RESET function do not present a problem because A20 masking is reset to the non-masking situation. An INIT type of initialization event as provided by the programmable keyboard controller, however, does not ordinarily reset or disable the A20 masking. As a result, the processor may not access the target of the boot vector in response to a "warm boot" or INIT. The effective boot vector may be pointing to malicious code. Alternatively, invalid code at the effective boot vector target may create a trappable exception that enables malicious code to have an entry into an unprotected system. The resulting masked address will identify memory space outside of the secure context of the FWH. Thus in order to ensure the processor accesses the appropriate FWH location upon initialization, the A20 masking feature must be disabled in response to an initialization event such as an INIT before attempting to fetch initialization code at the top of memory.

With respect to the cache vulnerability, the processor uses an instruction cache as a buffer for storing instructions to be executed after they have been fetched from memory. Before retrieving code from a target address in memory, the cache is checked to see if there is a "hit" indicating whether the identified memory contents are already present in the cache. If so, then the processor simply executes the instructions in the cache.

The cache can be populated with instructions or data as desired using a backside bus cache test to write a cache entry for the boot vector target and thus to place code that is not representative of the boot vector target code into the processor's instruction cache. An INIT initialization event leaves the cache and RAM intact and as a result the computer system could be rendered insecure by combining the backside bus cache test with an initialization event. Instead of retrieving initialization code from the boot device, the processor will detect a cache hit and begin executing the cached instructions (possibly vectoring the processor to viral code) instead of the secure instructions. The FWH blocks will be unlocked and vulnerable to unauthorized modification.

The cache vulnerability can be eliminated by performing a RESET instead of an INIT and thus poses no risk as long as the nonvolatile memory is locked and the exposure cannot be carried over from one session to the next. Unfortunately, however, the INIT function is necessary when updating the FWH and the FWH blocks must be unlocked. Thus to ensure that security is maintained when a FWH update is in process, at least a portion of the cache identifying the boot vector target must be invalidated in response to an initialization event. This ensures that the processor will fetch and execute initialization code stored securely within the FWH instead of code within the cache.

Figure 3:
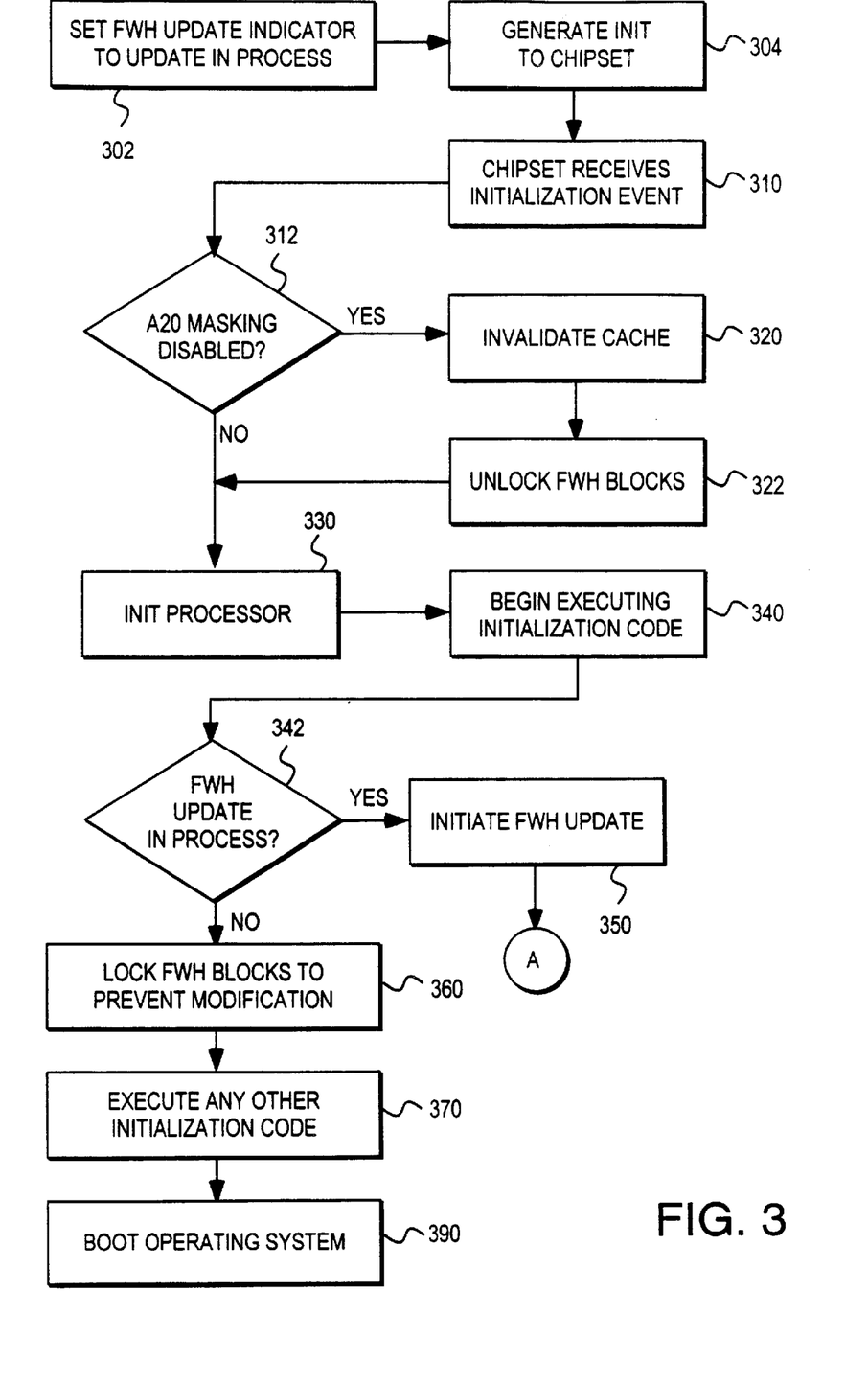
FIG. 3 illustrates a secure boot sequence for accommodating updates to the nonvolatile memory.

FIG. 3 illustrates one embodiment of a method of a boot process including procedures for modifying or updating the contents of the FWH in a secure context. This embodiment will not permit updates to the FWH if A20 masking is enabled. Before initializing the computer system a FWH update status is set to indicate whether a FWH update is in process in step 302. This would be performed, for example, by a nonvolatile memory or FWH update program.

Given that the decision to perform an update could occur when the computer system is no longer in a secure context or while the FWH blocks are locked, the computer system will have to be affirmatively initialized to establish a secure context with the FWH blocks unlocked. The computer system will thus have to be re-initialized to eliminate potentially harmful application code, viruses, or other software resident in the operating environment that may otherwise interfere with the update process.

The FWH update status must be located in some type of nonvolatile memory in order to ensure its availability during the next computer session (i.e., after the initialization event). In one embodiment, the FWH update status is stored in a battery backed complementary metal oxide semiconductor (CMOS) memory associated with the system clock of the computer system. The battery backed CMOS memory is also frequently used to store peripheral and other parameter data in microprocessor-based computer systems.

In step 304, a chipset initialization event is generated to start the update process. Steps 302 and 304 need not be performed during a given session unless an update is desired. The chipset and various computer components receive the initialization event in step 310. Step 312 determines whether the A20 masking has been disabled. If not, then the initialization event (i.e., INIT) is passed on to the processor in step 330. Otherwise, the processor cache is invalidated in step 320 and the FWH blocks are unlocked in step 322 before issuing the processor INIT in step 330.

The fact that A20 masking is not disabled before providing the processor with the INIT in step 330 does not pose a risk to the FWH. RESET or the application of power automatically resets the A20 masking. Although the INIT does not automatically do so, the FWH is not at risk of unauthorized access because the blocks will be locked from the previous session (i.e., before the INIT). Thus even if malicious code has masked A20 so that the processor is diverted from the target of the boot vector, the FWH will not be in a state to be modified.

In response to the INIT, the processor begins executing the initialization code such as the BIOS in step 340. If a FWH update is in process as determined in step 342, then a FWH update is initiated in step 350. Otherwise, the FWH blocks are locked to prevent modification in step 360. Any remaining initialization code such as re-enabling A20 masking is executed in step 370 before booting the operating system, if necessary, in step 390.

Figure 4:
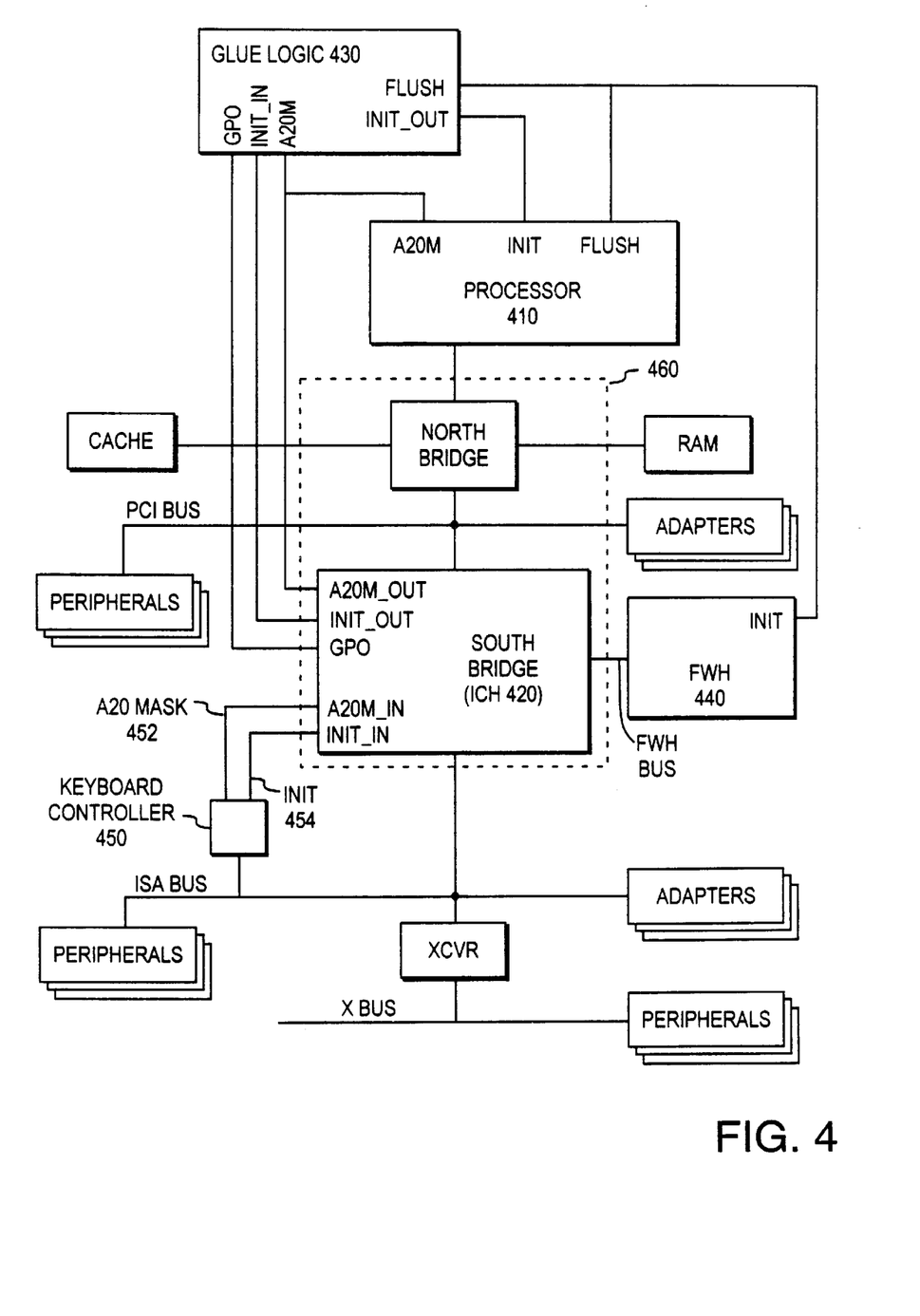
FIG. 4 illustrates one embodiment of a processor and a chipset for enabling a secure boot sequence.

FIG. 4 illustrates one embodiment of apparatus for incorporating these functions into the computer system. Computer system architectures designed around a particular microprocessor often use a chipset specifically designed to support the selected microprocessor. The chipset typically provides bus control functions and microprocessor control signals. In the illustrated embodiment, chipset components includes the keyboard controller 450, North and South bridges 460, glue logic 430, and FWH 440. In this embodiment, the South bridge is also referred to as the input/output controller hub (ICH) 420.

In the illustrated embodiment, keyboard controller 450 is capable of providing the INIT 454 signal and the A20 mask 452 signal. These signals are routed to ICH 420. ICH 420 provides a general purpose output (GPO), an INIT output (INIT_OUT), and an A20M masking signal output.

In response to a standard INIT 454 such as that provided by the keyboard controller 450, ICH 420 automatically disables A20 masking. The INIT 454 will be passed through to the INIT pin of processor 410, but not to FWH 440. As a result, a standard INIT as might be performed will not flush the processor cache nor will it unlock the FWH 440 blocks. Thus applications except those designed to update the nonvolatile memory should function as expected.

In order to update the nonvolatile memory, the improved nonvolatile memory update program issues ICH 420 commands to perform the following sequence: 1) disable A20 masking, 2) transition the GPO signal, 3) assert the INIT signal.

A transition in the GPO bit while the A20M line is high (i.e., A20 masking disabled) starts an exception sequence in glue logic 430. First, now that A20 masking is disabled, the glue logic 430 asserts the FLUSH signal to write-back and invalidate the microprocessor cache. In one embodiment, the FLUSH signal is asserted for approximately 13 milliseconds (ms). The FLUSH signal is also used to INIT the FWH 440 such that the FWH blocks are unlocked. Before FLUSH is deasserted, the processor INIT signal is asserted low to transfer execution to the FWH address identified by the processor boot vector. In one embodiment, the processor INIT is asserted for approximately 90 nanoseconds (ns).

With this technique, glue logic 430 effectively intercepts the INIT 454 signal and ensures that the FWH block locking will not be reset with the standard INIT 454. If INIT 454 is part of the FWH 440 update process as indicated by a transition in the GPO signal, the FLUSH signal will unlock the FWH blocks to enable updates. The FLUSH signal also flushes the processor cache so that the processor must fetch code from the FWH. Thus glue logic 430 prohibits unlocking of the nonvolatile memory FWH unless address line masking is disabled. Moreover, glue logic 430 invalidates at least a portion of the processor cache, initializes the processor and unlocks the nonvolatile memory in response to a initialization event if a nonvolatile memory update is in process and processor address line masking is disabled.

Figure 5:
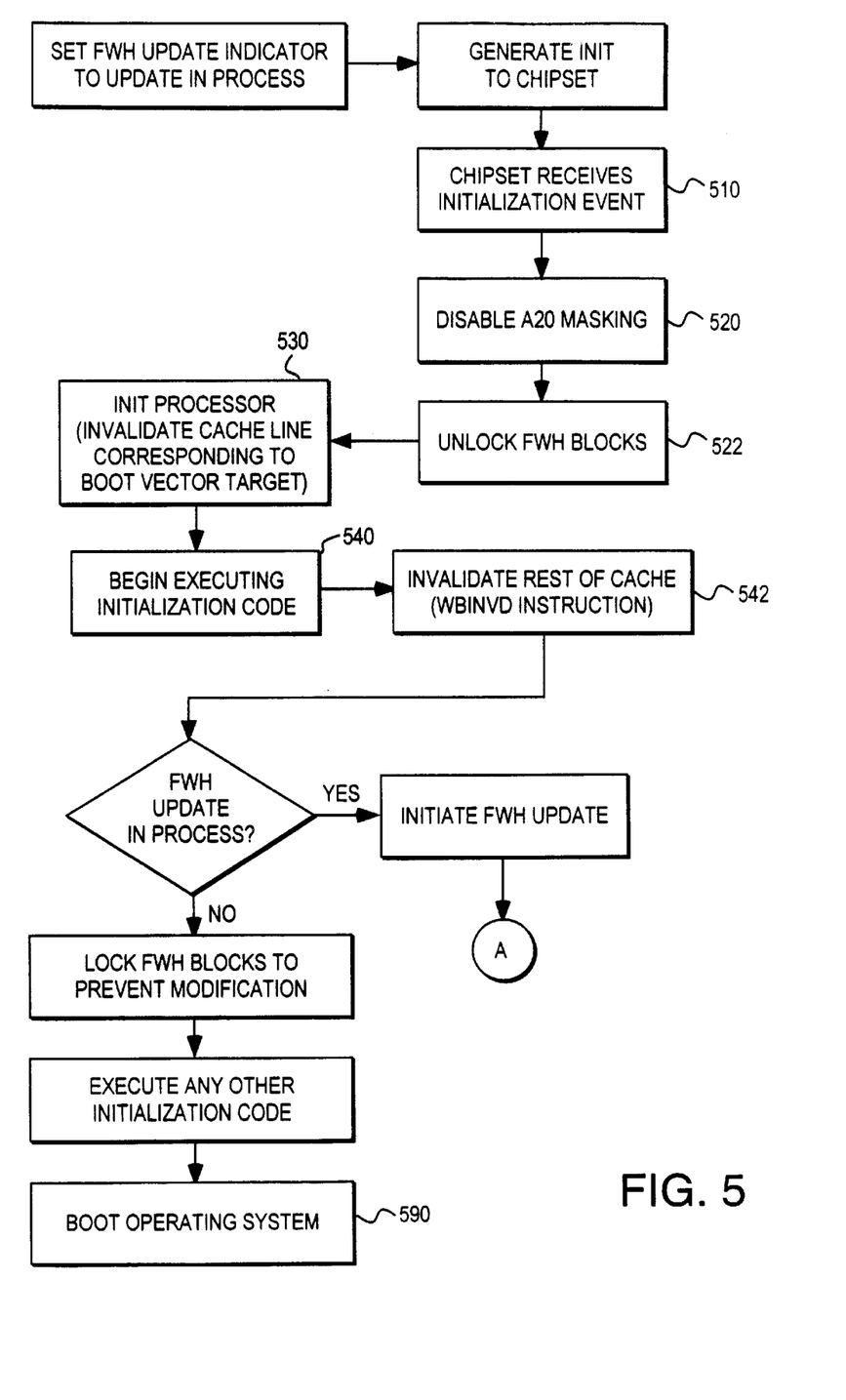
FIG. 5 illustrates an alternative secure boot sequence for accommodating updates to the nonvolatile memory.

FIG. 5 illustrates an alternative embodiment of the boot process of FIG. 3. In response to an initialization event received by the chipset in step 510, A20 masking is affirmatively disabled in step 520. The FWH blocks are unlocked in step 522 before performing a processor INIT in step 530. If a FWH update is not in process, the INIT is passed onto the processor in step 530. The remainder of the process is the same as that of FIG. 3. The processor is designed, however, to automatically invalidate at least a portion of a cache reference to the boot vector target in response to an initialization event. Thus a cache invalidation step before provision of the INIT to the processor is not necessary. For processors without this feature, the cache references to the boot vector target must be invalidated before performing the processor INIT in step 530.

Figure 6:
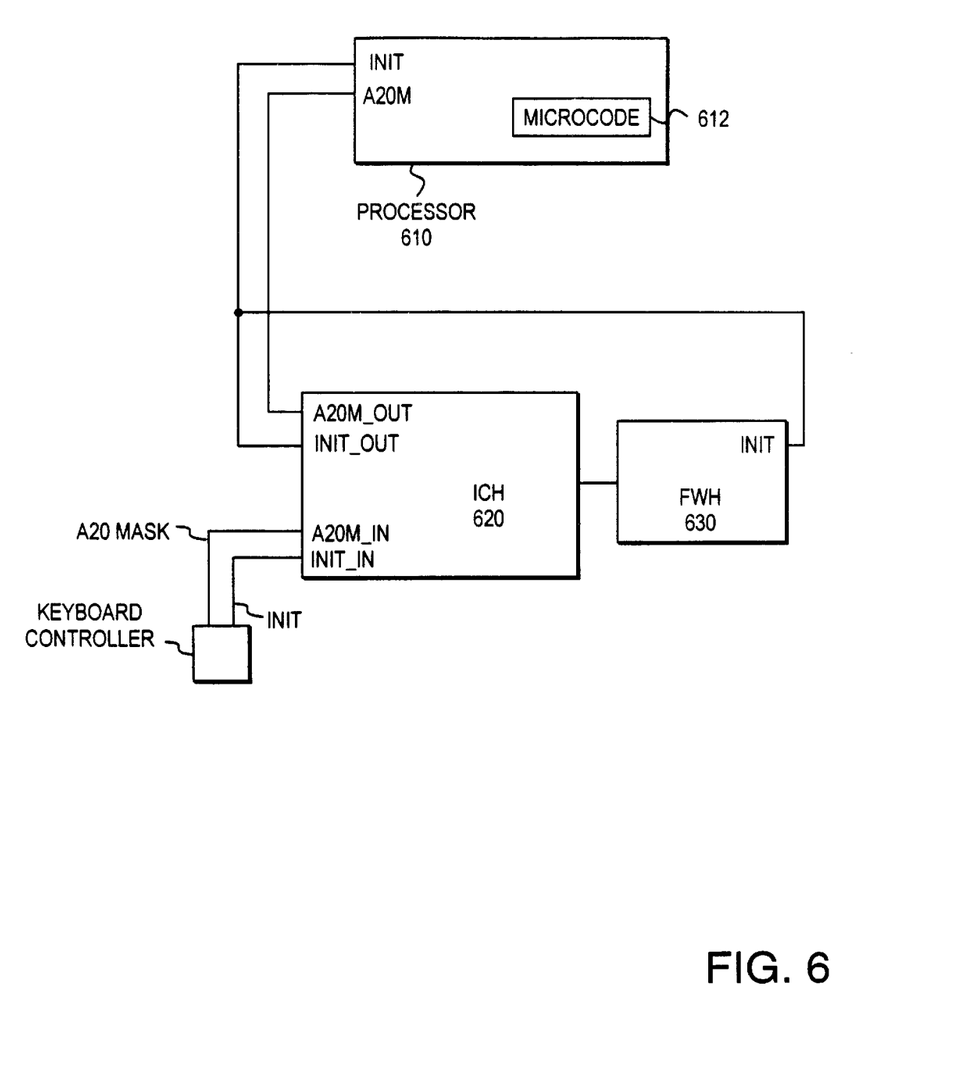
FIG. 6 illustrates an alternative embodiment of a processor and an accompanying chipset for enabling a secure boot sequence.

FIG. 6 illustrates a microprocessor 610 and chipset components including ICH 620 and FWH 630 for implementing the functions set forth in the method of FIG. 5. Logic circuitry (i.e., ICH 620) coupled to the nonvolatile memory and the processor prohibits unlocking of the nonvolatile memory unless address line masking is disabled. ICH 620 disables address line masking, initializes the processor, and unlocks the nonvolatile memory in response to an initialization event if a nonvolatile memory update is in process.

In this embodiment, the ICH 620 intercepts the A20 masking (A20_IN) and INIT (INIT_IN) signal from the keyboard controller as before. ICH 620 provides the INIT (i.e., INIT_OUT) and A20 masking signals directly to the processor 610 and the FWH 630 rather than through glue logic. In this embodiment, glue logic is unnecessary because the processor has no FLUSH pin and the ICH 620 does not permit an INIT to be issued to the processor and FWH unless A20 masking is disabled. Consistent with FIG. 5, ICH 620 affirmatively disables A20 masking as indicated in step 520 for FWH updates.

Processor microcode contained in microcode read only memory (ROM) 612 has been designed to invalidate at least a portion of the processor cache in response to a processor INIT (i.e., step 530). In one embodiment, the microcode invalidates the top line of cache corresponding to the boot vector target at FFFF FFF0 before performing a fetch. In order to ensure that the remainder of the cache is invalidated, one of the first instructions executed by the processor after jumping to the boot vector target should invalidate the remainder of the cache. In one embodiment, this is accomplished with a write-back invalidate (WBINVD) instruction during execution of the initialization code of step 540 as explicitly set forth in step 542 of FIG. 5. Thus in one embodiment the cache invalidation is partial until a subsequent complete invalidation command.

Referring to FIG. 3, step 320 can thus be accomplished in a single step or by a series of steps. In one embodiment, the entire cache is flushed (FIG. 4) through the assertion of the FLUSH signal. In an alternative embodiment (FIG. 6), minimal portions of the cache (e.g., the boot vector target) are invalidated in microcode to force a boot vector target fetch from the FWH. The remainder of the cache is then invalidated when the processor fetches and executes a cache invalidate instruction (WBINVD) from the FWH.

Referring to FIGS. 3 and 5, the FWH update process may be initiated once the computer system has been initialized to a secure context. The FWH contents can be modified securely only if the processor is booted in a secure context, the procedures for performing the upgrade are protected, and the upgrade image itself is verified as secure. If any of these conditions are not met, the computer system may be not be able to establish the intended secure context during the next initialization sequence.

Figure 7:
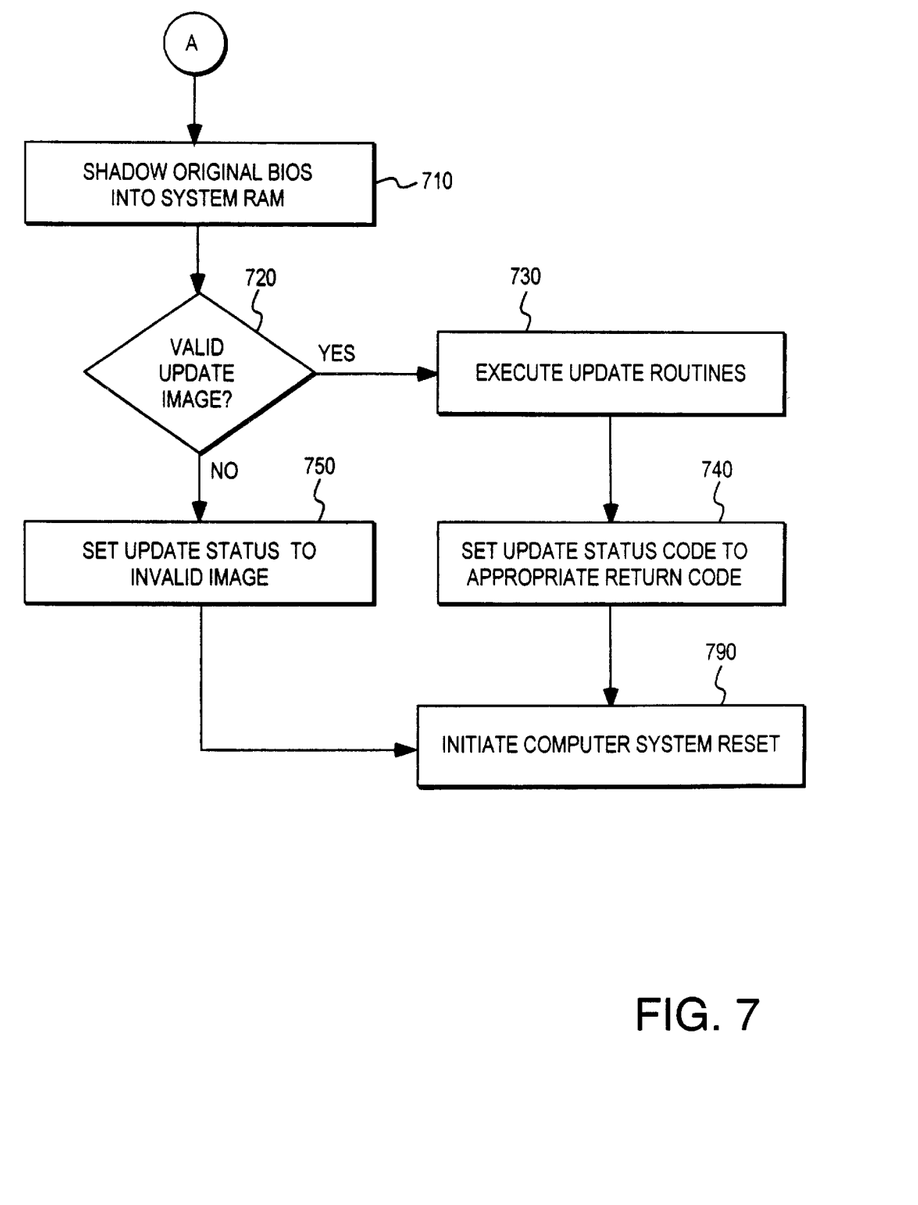
FIG. 7 illustrates a method of updating the nonvolatile memory.

FIG. 7 illustrates one embodiment of the FWH update process. Beginning with step 710, the original BIOS is shadowed (i.e., copied) into system RAM. This is necessary in order to ensure that the secure BIOS update procedures (if used) are available if the update image may be physically overwriting the current BIOS image.

Step 720 determines if the update image is valid. This may be accomplished in any number of ways. A cyclic redundancy check (CRC) checksum can be used to determine if the update image has been corrupted. A digital signature can be used to indicate that the update image is from a secure source or otherwise known to be authentic.

If the update image is invalid, then the update status is set to indicate that the image is invalid in step 750. The computer system can then be re-initialized in step 790 to ensure that the system is returned to a secure context with the BIOS intact.

If the update image is valid in step 750, then the shadowed update routines can be executed in step 730. The update status code is then set to indicate the successfulness of the update attempt in step 740. The computer system can then be re-initialized in step 490 to ensure that the system is booted in a secure context with the new BIOS image.

Methods and apparatus to enable secure booting and modification of a computer system with a lockable nonvolatile memory coupled to a processor having a cache and maskable address lines. Generally, in order to ensure that actual boot vector target and the effective boot vector target are the same, address line masking must be disabled during initialization. Moreover, unlocking of the nonvolatile memory during initialization should be prohibited unless address line masking is disabled. If the initialization event is part of a nonvolatile memory update process, then the processor cache should also be invalidated to ensure that code is at least initially fetched from the trusted context of the nonvolatile memory.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
   a processor having maskable address lines and a cache;
   a lockable nonvolatile memory; and
   logic circuitry coupled to the nonvolatile memory and the processor, wherein the logic circuitry prohibits unlocking of the nonvolatile memory unless address line masking is disabled, wherein the logic circuitry invalidates at least a portion of the processor cache, initializes the processor, and unlocks the nonvolatile memory in response to a initialization event if a nonvolatile memory update is in process and processor address line masking is disabled.

2. The apparatus of claim 1 wherein the nonvolatile memory comprises blocks of flash re-writable memory.

3. The apparatus of claim 1 wherein a processor integrated circuit package includes a FLUSH pin coupled to the logic circuitry for invalidating the processor cache.

4. The apparatus of claim 1 wherein processor boot vector identifies a portion of a basic input output system (BIOS) stored in the nonvolatile memory.

5. A method comprising the steps of:
   a) providing an initialization event to a computer system comprising a processor with maskable address lines coupled to a lockable nonvolatile memory;
   b) performing the following steps, if a nonvolatile memory update is in process:

i) disabling address line masking;
ii) unlocking the nonvolatile memory; and
iii) invalidating at least a portion of the processor cache referencing the nonvolatile memory.

6. The method of claim 5 wherein step b)(iii) further comprises the steps of providing a processor with a flush signal to invalidate the entire processor cache.

7. The method of claim 5 wherein step b)(iii) further comprises the step of executing microcode within the processor in response to the initialization event to invalidate at least a portion of a processor cache associated with the nonvolatile memory.

8. The method of claim 7 further comprising the step of fetching an instruction from the nonvolatile memory, wherein the processor invalidates the entire processor cache upon execution of the instruction.

9. The method of claim 5 further comprising the step of:
b) executing initialization code identified by a boot vector of the processor, wherein a boot vector target is located within the nonvolatile memory.

10. The method of claim 5 further comprising the step of:
b) locking the nonvolatile memory, if the nonvolatile memory update is not in process.

11. An apparatus comprising:
a processor having maskable address lines and a cache;
a lockable nonvolatile memory; and
logic circuitry coupled to the nonvolatile memory and the processor, wherein the logic circuitry prohibits unlocking of the nonvolatile memory unless address line masking is disabled, wherein the logic circuitry disables address line masking, initializes the processor, and unlocks the nonvolatile memory in response to an initialization event if a nonvolatile memory update is in process.

12. The apparatus of claim 11 wherein the processor further comprises:
a microcode memory, wherein during initialization the microcode memory instructs the processor to invalidate at least a portion of the processor cache referencing a boot vector target in the nonvolatile memory.

13. The apparatus of claim 12 wherein the microcode memory instructs the processor to invalidate only the processor cache portion referencing the boot vector target in nonvolatile memory.

14. The apparatus of claim 11 wherein a processor boot vector identifies a portion of a basic input output system (BIOS) stored in the nonvolatile memory.

15. The apparatus of claim 14 wherein the BIOS includes a write-back invalidate command to invalidate the entire processor cache.

* * * * *